(12) United States Patent
Han

(10) Patent No.: US 10,324,885 B2
(45) Date of Patent: Jun. 18, 2019

(54) DISPLAY DEVICE OF ADDIN CARD

(71) Applicant: EVGA CORPORATION, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 117 days.

(21) Appl. No.: 15/499,917

(22) Filed: Apr. 28, 2017

(65) Prior Publication Data

US 2018/0314665 A1  Nov. 1, 2018

(51) Int. Cl.
*G06F 3/01* (2006.01)
*G06F 13/40* (2006.01)
*G06F 3/14* (2006.01)

(52) U.S. Cl.
CPC ............ *G06F 13/4081* (2013.01); *G06F 3/14* (2013.01)

(58) Field of Classification Search
None
See application file for complete search history.

(56) References Cited

U.S. PATENT DOCUMENTS 9,213,379 B2 * 12/2015 Wong .................. F04D 25/0613

* cited by examiner

*Primary Examiner* — Cheng Yuan Tseng
(74) *Attorney, Agent, or Firm* — Leong C. Lei

(57) ABSTRACT

A display device of an addin card generally includes, in structure, an addin card, a display device, a control board, and control software. The addin card is in information connection with the display device and the control board. The control software is loaded in the control board and is in information connection with the addin card. The display device access and reads hardware status data of the addin card, such as an operation temperature, a fan rotational speed, and a processing frequency. As such, in an attempt to observe the current hardware status data of the addin card, a user is allowed to make direct observation of the data on the display device without activating the control software. To change the operation performance of the addin card, the user may operate the control software to control the addin card, without entering BIOS, this being very convenient for the user.

5 Claims, 5 Drawing Sheets

DISPLAY DEVICE OF ADDIN CARD

TECHNICAL FIELD OF THE INVENTION

The present invention relates generally to an addin card, and more particularly to a display device of an addin card, in which a display device is mounted on and connected with an addin card to allow a user to directly read data of current conditions of the addin card displayed on the display device.

DESCRIPTION OF THE PRIOR ART

Temperature of a graphics card is an important parameter of operation. When an operation frequency of the graphics card is increased, the temperature is also increased and it becomes necessary to adjust a rotational speed of a fan mounted on the graphics card to increase the performance of heat dissipation in order to keep the graphics card in a safe condition for operation. A graphics card comprises, structurally, a graphic processor, which is generally the core component of the graphics card and functions to perform processing operations associated with graphics; multiple memories, which are in information connection with the graphic processor to serve as storage device for data of the graphics card; a graphics card interface, which is generally an interface in the form of an array of golden fingers for connection with a computer and include multiple insertion slots for connection with external devices; and a heat dissipation device arranged on the graphic processor for generally dissipating heat generated during the operation of the graphic processor, wherein the heat dissipation device generally comprises a fan and multiple fins. Further, it is often necessary to monitor and/or adjust operation parameters of the graphics card during the operation thereof in order to fit the needs for operation. Variation of the operation parameters may be achieved by adjusting BIOS of the graphics card and thus, a user must first activate BIOS of the computer and thus conduct adjustment of the operation parameters. During the operation of the graphics card, an operation may observe the temperature of the graphics card with the computer and once the temperature gets high, the rotational speed of the fan may be changed with the computer. Such an operation requires skilled persons who are very familiar with the operation of computers, and is generally hard for ordinary users. Particularly, incorrect change of BIOS may be hard to correct for people who are not familiar with BIOS. This would cause troubles in operations.

Thus, it is a challenge of those devoted in this field to provide a solution to overcome such problems.

SUMMARY OF THE INVENTION

In view of the above problems and drawbacks, the present invention aims to provide a display device of an addin card, in which a display device is mounted on and connected with an addin card to allow a user to directly read data of current conditions of the addin card displayed on the display device.

The primary objective of the present invention is to provide an arrangement of a display device to allow a user to make direct observation of current hardware status data of an addin card on the display device, without activating control software, so as to be very convenient for the user.

A general structure that the present invention is adopted to achieve the above objective comprises an addin card, wherein the addin card is in information connection a display device and a control board. The display device is operable to read and access hardware status data of the addin card and display these data thereon. The control board is loaded therein control software, and the control software is in information connection with the addin card to control operation performance of the addin card. In this way, a user, in an attempt to control the operation performance of the addin card, may activate the control software in an interface of Microsoft Windows for directly setting the addin card by means of the control software, this being extremely convenient for the user. More importantly, when the user wishes to just observe the current values of the hardware status data (such as an operation temperature, a fan rotational speed, and a processing frequency) of the addin card, the user is allowed to make the observation directly on the display device, without activating the control software, and this is very convenient. As such, the user may set the operation performance of the addin card without entering BIOS of a computer and may make direct observation on the display device without activating the control software.

The above-described technique overcomes the drawbacks and problems of the prior art graphics card, where to change operation parameters or to monitor the parameters, setting or observation must be made through BIOS, and such an operation can only be conducted by people who are very familiar with computers and no ordinary user can do that, and where incorrect operation made on BIOS may make it hard to correct back for people not familiar with BIOS, and thus the present invention does provide advantages concerning practical utilization.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
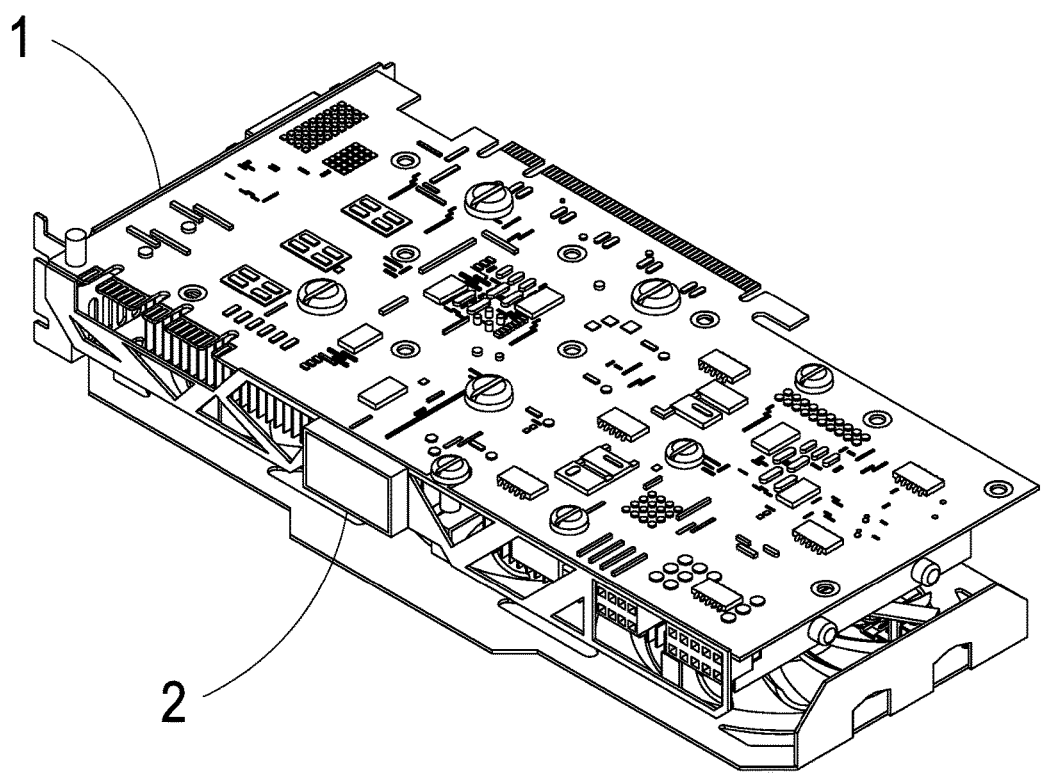
FIG. 1 is a perspective view showing an addin card according to a preferred embodiment of the present invention.
Figure 2:
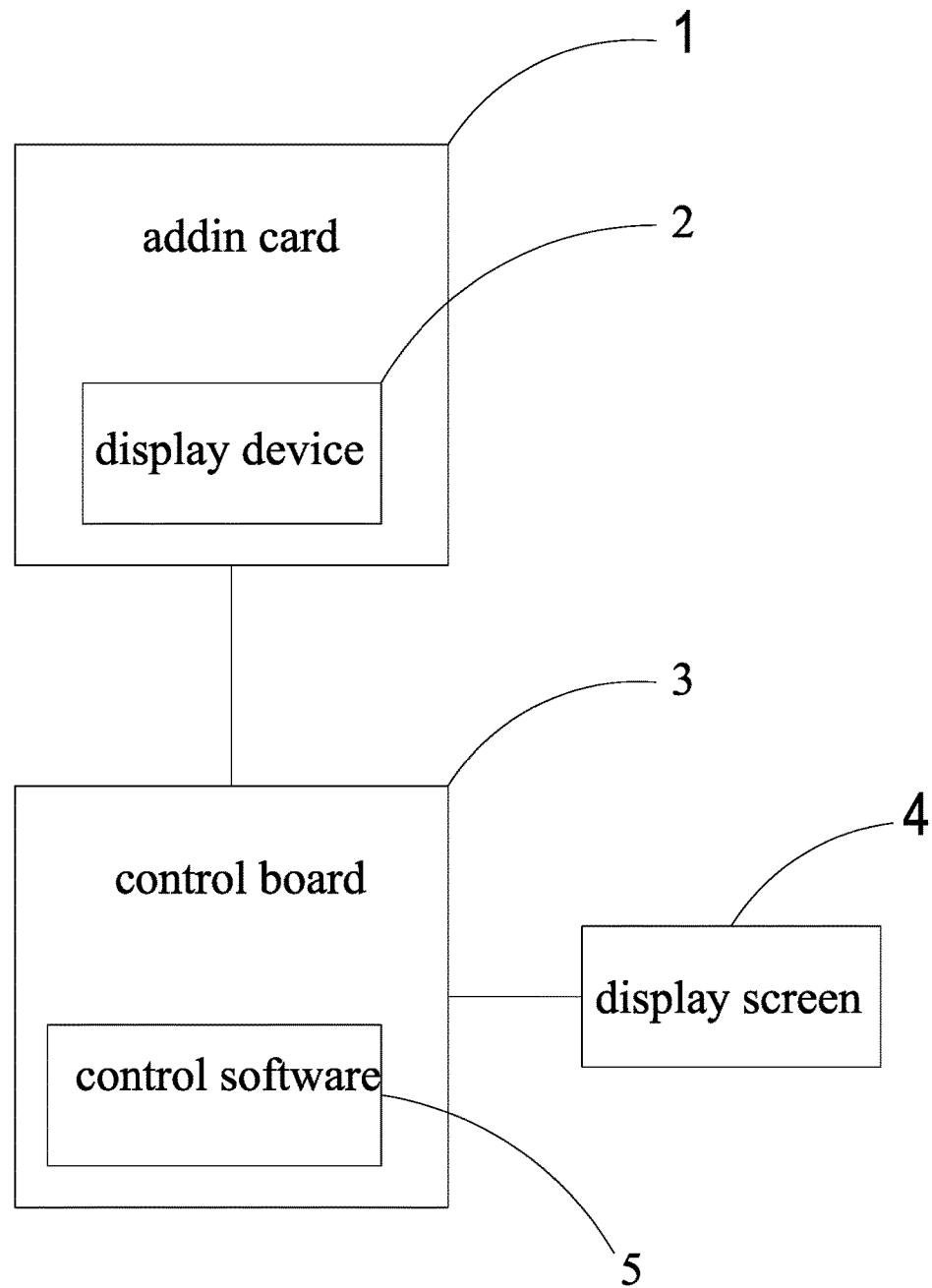
FIG. 2 is a block diagram illustrating the preferred embodiment of the present invention.
Figure 3:
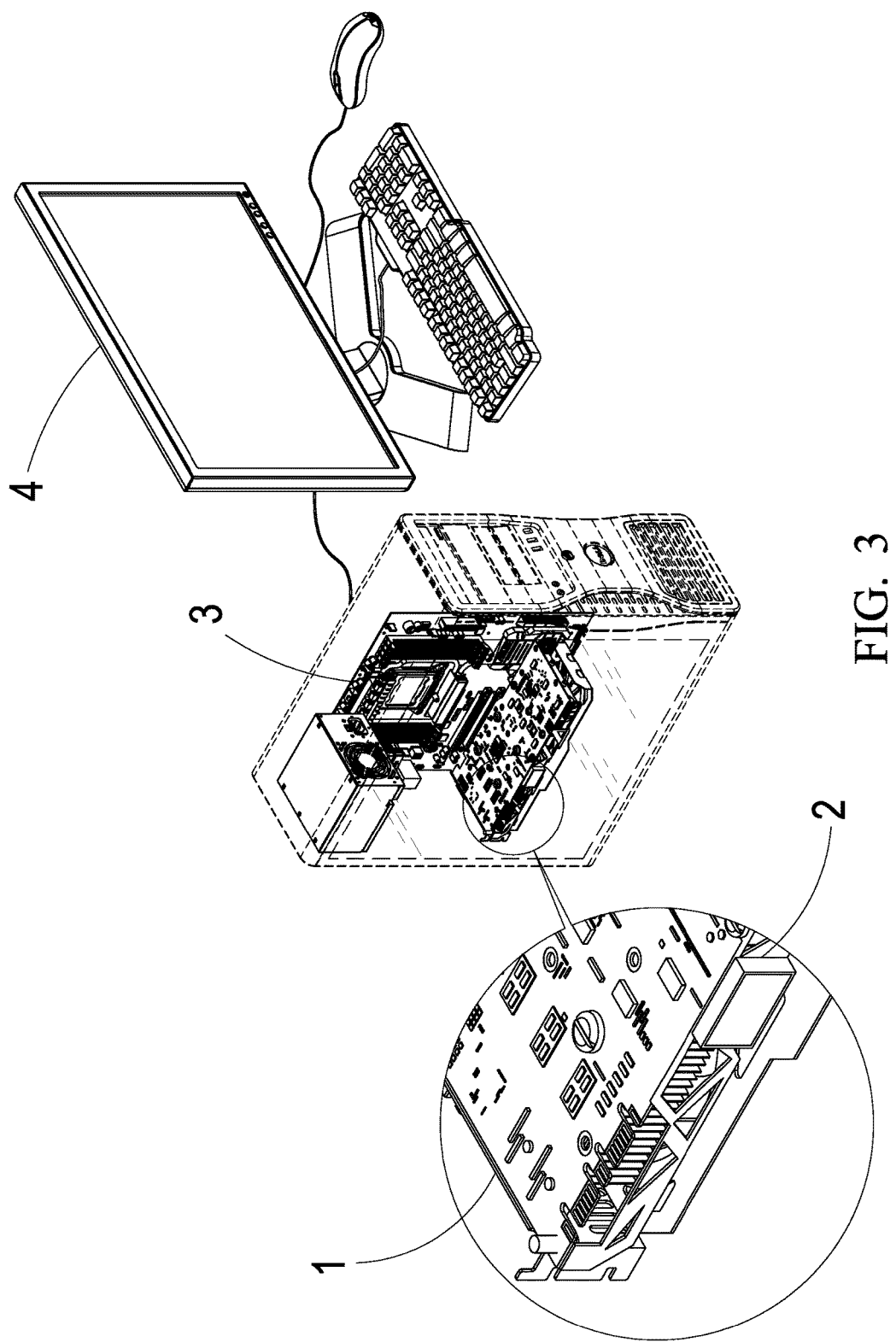
FIG. 3 is a schematic view showing an application of the preferred embodiment of the present invention.
Figure 4:
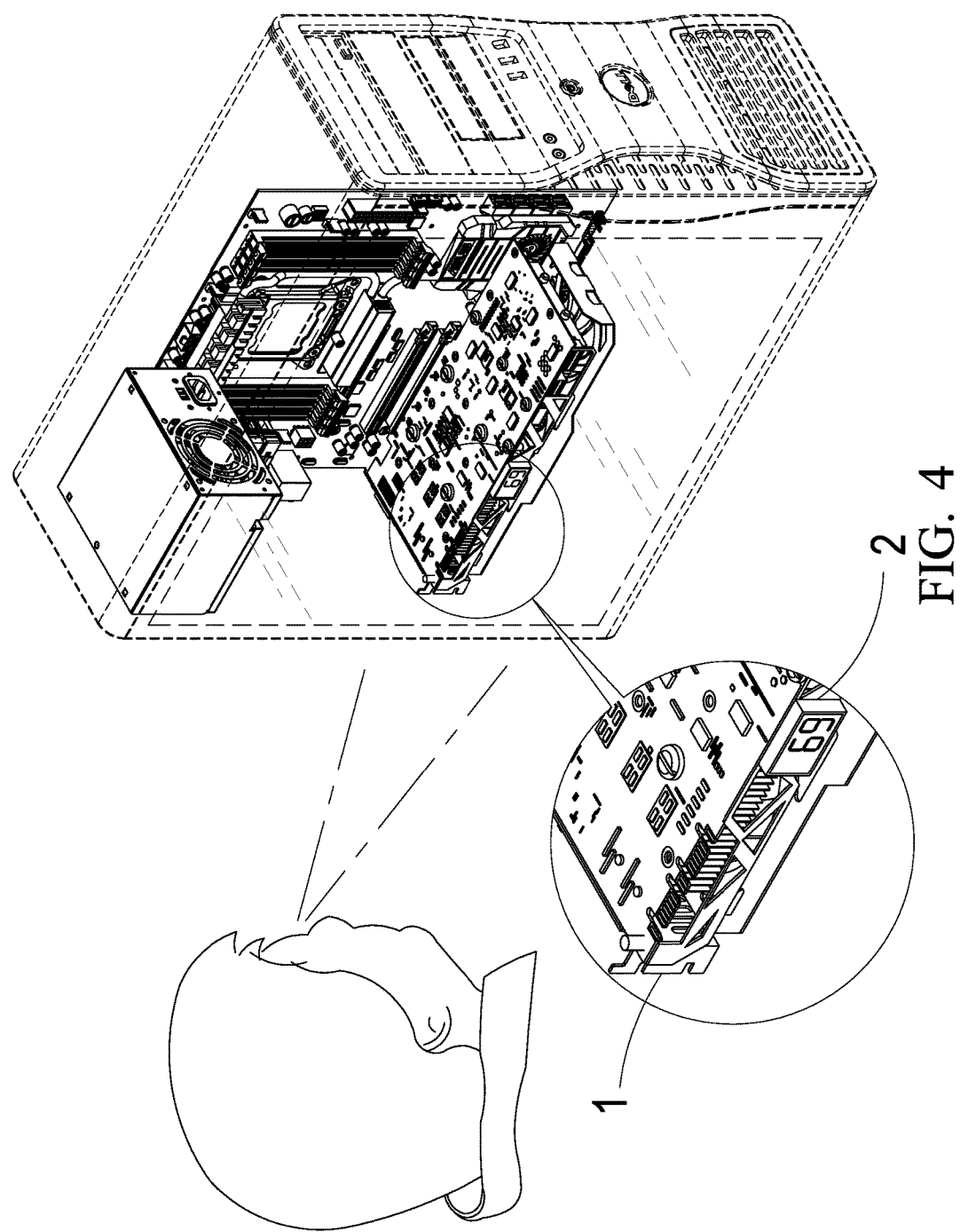
FIG. 4 is a schematic view illustrating an example of a user observing a display device of the preferred embodiment of the present invention.
Figure 5:
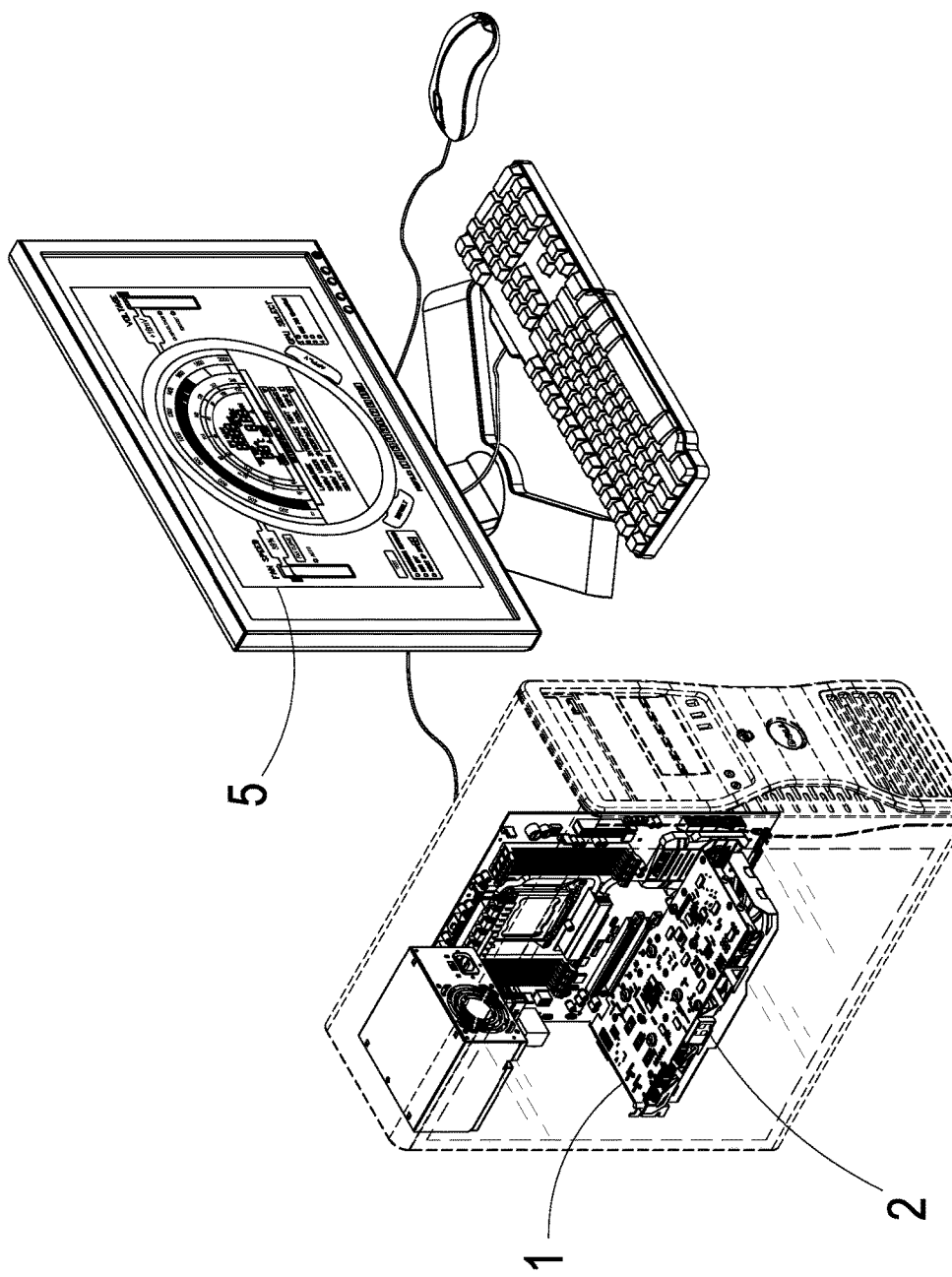
FIG. 5 is a schematic view illustrating an example of operation of control software of the preferred embodiment of the present invention.

Referring to FIGS. 1, 2, and 3, which are respectively a perspective view showing an addin card according to a preferred embodiment of the present invention, a block diagram illustrating the preferred embodiment of the present invention, and a schematic view showing an application of the preferred embodiment of the present invention, these drawings clearly show that the present invention comprises:

an addin card 1;

a display device 2, which is arranged at and mounted to one side of the addin card 1 and in information connection with the addin card 1, wherein the display device 2 is operable to read and display hardware status data of the addin card 1, where the hardware status data comprise one of an operation temperature, a fan rotational speed, and a processing frequency;

a control board 3, which is in information connection with the addin card 1, wherein the control board 3 is in information connection with a display screen 4 and the display screen 4 functions to display control software 5, which will be discussed below; and the control software 5, which is arranged in the control board 3 and in information connection with the addin card 1, wherein the control software 5 controls one of the fan rotational speed and the processing frequency of the addin card 1.

Further, the display device 2 comprises one of a liquid crystal display (LCD) and a seven-segment display.

Referring to FIGS. 1, 2, 3, 4, and 5, which are respectively a perspective view showing an addin card according to a preferred embodiment of the present invention, a block diagram illustrating the preferred embodiment of the present invention, a schematic view showing an application of the preferred embodiment of the present invention, a schematic view illustrating an example of a user observing a display device of the preferred embodiment of the present invention, and a schematic view illustrating an example of operation of control software of the preferred embodiment of the present invention, as clearly shown in these drawings, in an attempt to check an operation temperature, a fan rotational speed, or a processing frequency that is currently involved in the addin card 1 (of which a a graphics card of a computer is taken an example in the instant embodiment), a user may make direct observation of the reading from the display device 2 that is arranged at one side of the addin card 1, wherein the display device 2 displays the current hardware status data of the addin card 1, which may include an operation temperature, a fan rotational speed, and/or a processing frequency. It is also feasible for the user to manipulate the control software 5 to set desired hardware status data for the display device 2, or to individually display the operation temperature, or to individually display the fan rotational speed, all these being available as desired by the user, or all or some of these being simultaneously shown. It is apparent that the user may observe the hardware status data of the addin card 1 by means of the display device 2, without activating the control software 5. This is convenient for the user.

Further, the user, in an attempt to change the operation performance of the addin card 1, may activate and operate the control software 5 to make settings of the addin card 1, without rebooting to enter BIOS, this being convenient for the user.

Further, the control software 5 is made in compliance with interface of Microsoft Windows for operation and it is apparent that the control software 5 is executed in Microsoft Windows, but not ordinary BIOS systems, so that convenience and utilization can be greatly improved.

Further, the display screen 4 can be a display screen of a computer or a display screen of a handheld electronic device.

The example provided previously is concerned about just a preferred way of embodying the present invention and is not intended to impose limitations to the scope of the present invention. Minor modifications and variations that do not depart from the inventive idea of the present invention as defined in the attached claims, are considered within the scope of the present invention.

Thus, with reference to all the drawings, when put into use, the present invention provides, compared to the prior art, the following advantages:

With the arrangement of the display device 2, the user is allowed to directly observe and access current hardware status data of the addin card 1 from the display device 2, without activating and operating the control software 5, and this is apparently very convenient for the user.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A display device of an addin card, comprising:
an addin card;
a display device, which is in information connection with the addin card, the display device being operable to read and display hardware status data of the addin card;
a control board, which is in information connection with the addin card; and
control software, which is loaded in the control board and in information connection with the addin card;
wherein the control board is in information connection with a display screen, which is operable to display the control software; and
wherein the display device is arranged at and mounted to one side of the addin card.

2. The display device of the addin card according to claim 1, wherein the hardware status data comprise one of an operation temperature, a fan rotational speed, and a processing frequency.

3. The display device of the addin card according to claim 1, wherein the control software controls one of a fan rotational speed and a processing frequency of the addin card.

4. The display device of the addin card according to claim 1, wherein the display device comprises one of a liquid crystal display (LCD) and a seven segment display.

5. The display device of the addin card according to claim 1, wherein the control software complies with an interface of Microsoft Windows for operation.

* * * * *